United States Patent
Zeng et al.

(10) Patent No.: US 11,892,068 B1
(45) Date of Patent: Feb. 6, 2024

(54) DIFFERENTIAL SELF-LOCKING DEVICE

(71) Applicant: SHENZHEN XINGKANG POWER ASSEMBLY CO., LTD., Shenzhen (CN)

(72) Inventors: Qingwen Zeng, Shenzhen (CN); Weiwei Xiong, Shenzhen (CN)

(73) Assignee: SHENZHEN XINGKANG POWER ASSEMBLY CO., LTD., Shenzhen (CN)

( * ) Notice: Subject to any disclaimer, the term of this patent is extended or adjusted under 35 U.S.C. 154(b) by 0 days.

(21) Appl. No.: 18/448,153

(22) Filed: Aug. 10, 2023

(30) Foreign Application Priority Data

Aug. 22, 2022 (CN) .......................... 202211006148.7

(51) Int. Cl.
*F16H 48/29* (2012.01)
*F16H 48/22* (2006.01)
*F16H 48/11* (2012.01)

(52) U.S. Cl.
CPC ............ *F16H 48/29* (2013.01); *F16H 48/11* (2013.01); *F16H 48/22* (2013.01)

(58) Field of Classification Search
CPC ........... F16H 48/29; F16H 48/11; F16H 48/22
See application file for complete search history.

(56) References Cited

U.S. PATENT DOCUMENTS

| | | | | |
|---|---|---|---|---|
| 1,164,769 A | * | 12/1915 | Walter et al. ........... | F16H 48/29 475/227 |
| 4,916,978 A | * | 4/1990 | Razelli ..................... | F16H 48/29 475/249 |
| 5,183,446 A | * | 2/1993 | Hughes .................... | F16H 48/08 475/236 |
| 6,354,978 B1 | * | 3/2002 | Brackin ................... | F16H 48/34 475/237 |

FOREIGN PATENT DOCUMENTS

| | | | | |
|---|---|---|---|---|
| GB | 2182733 A | * | 5/1987 | ............. F16H 48/29 |
| WO | WO-2012024841 A1 | * | 3/2012 | ............. F16H 48/29 |

* cited by examiner

*Primary Examiner* — Tisha D Lewis

(57) ABSTRACT

A differential self-locking device includes a differential housing, a half-shaft output gear set disposed in the differential housing, an upper worm and worm gear mechanism, a lower worm and worm gear mechanism, a differential planetary gear set, and a worm gear shaft. The upper worm and worm gear mechanism and the lower worm and worm gear mechanism respectively convert a large output torque of the left half-shaft output gear and a large output torque of the right half-shaft output gear into small output torque thereof to lock the left half-shaft output gear and the right half-shaft output gear, thereby achieving automatic locking or unlocking of the differential self-locking device. A traction force of a vehicle is converted into torques of the left half-shaft output gear and the right half-shaft output gear, which improves passing ability of the vehicle.

9 Claims, 3 Drawing Sheets

DIFFERENTIAL SELF-LOCKING DEVICE

TECHNICAL FIELD

The present disclosure relates to a technical field of differential locks based on torque difference, and in particular to a differential self-locking device.

BACKGROUND

Differential lock is a differential gear with automatic locking function, which is used to improve a passing ability of a vehicle on harsh roads. When one of two driving tire axles of the vehicle spins, the differential gear quickly locks, resulting in rigid coupling between the two tire drive axles.

In conventional differential self-locking device, a clutch device is generally disposed in an axis direction of a left half-shaft output gear and a right half-shaft output gear, and a mechanical execution element or an electro-hydraulic execution element operates the clutch device to lock a left half-shaft output gear, a right half-shaft output gear, and a housing of the differential gear. Thus, a skidding problem of the vehicle is solved by forcing the left right half-shaft output gear, the right half-shaft output gear, and the housing of the differential gear to be differentially locked. There is another differential self-locking device (Torsen differential A) using pairs of worm gears and two worms, where the worm gears are respectively meshed with the worms to interlock, and torques of the worm gears are respectively unidirectionally to the worms, so that the Torsen differential A is differentially locked.

However, in the conventional differential self-locking device, the clutch device is disposed in the axis direction of the left half-shaft output gear and the right half-shaft output gear, and as a result, a structure thereof is complex, control is complicated, a differential lock response is delayed, and cost is high.

Further, the Torsen differential A is a differential linear self-locking device adopting pairs of worm gears and the two worms. Specifically, the Torsen differential A comprises a left shaft worm, a right shaft worm, and six worm gears, where the six worm gears each has two straight gears. That is, the Torsen differential A comprises twelve straight gears. Three of the six worm gears are meshed with the left shaft worm. The other three of the six worm gears are meshed with the right shaft worm gear. The six worm gears are meshed with the left shaft worm gear and the right shaft worm gear through the twelve straight gears. However, such meshing assembly process requires very high dimensional accuracy and consistency for each of the worm gears, requires a high positioning assembly process. Further, a radial size of the Torsen differential A is large, a weight of the Torsen differential A is large, cost is high, noise, vibration, harshness (NVH) of the Torsen differential A is poor, and components of the Torsen differential A are easy to wear.

SUMMARY

In order to improve above deficiencies, the present disclosure provides a differential self-locking device. The differential self-locking device comprises a differential housing, a half-shaft output gear set, an upper worm and worm gear mechanism, a lower worm and worm gear mechanism, a differential planetary gear set, a worm gear shaft, a brake pads, and a positioning shaft sleeve. The half-shaft output gear set, the upper worm and worm gear mechanism, the lower worm and worm gear mechanism, the differential planetary gear set, the worm gear shaft; the brake pads; and the positioning shaft sleeve are disposed in the differential housing. The half-shaft output gear set includes a left half-shaft output gear and a right half-shaft output gear. The left half-shaft output gear and the right half-shaft output gear are symmetrically disposed in the differential housing. The upper worm and worm gear mechanism and the lower worm and worm gear mechanism are rotationally symmetrically disposed. The upper worm and worm gear mechanism and the lower worm and worm gear mechanism are meshed with the left half-shaft output gear and the right half-shaft output gear.

The differential planetary gear set is disposed between the upper worm and worm gear mechanism and the lower worm and worm gear mechanism. The differential planetary gear set is meshed with the upper worm and worm gear mechanism, the lower worm and worm gear mechanism, the left half-shaft output gear, and the right half-shaft output gear. The worm gear shaft is disposed between the left half-shaft output gear and the right half-shaft output gear. The worm gear shaft is coaxially connected to an upper worm gear of the upper worm and worm gear mechanism and a lower worm gear of the lower worm and worm gear mechanism.

In one optional embodiment, the upper worm and worm gear mechanism includes an upper worm gear, a first upper worm, and a second upper worm. The upper worm gear is disposed between the left half-shaft output gear and the right half-shaft output gear. The first upper worm and the second upper worm are rotatably parallelly disposed on two sides of the upper worm gear. The first upper worm and the second upper worm are connected to the upper worm gear through gear meshing.

In one optional embodiment, one end of the first upper worm is connected to the right half-shaft output gear through gear meshing. One end of the second upper worm is connected to the left half-shaft output gear through gear meshing.

In one optional embodiment, the lower worm and worm gear mechanism comprises a lower worm gear, a first lower worm, and a second lower worm. The lower worm gear is disposed between the left half-shaft output gear and the right half-shaft output gear. The first lower worm and the second lower worm are rotatably parallelly disposed on two sides of the lower worm gear. The first lower worm and the second lower worm are connected to the lower worm gear through gear meshing.

In one optional embodiment, one end of the first lower worm is connected to the left half-shaft output gear through gear meshing. One end of the second lower worm is connected to the right half-shaft output gear through gear meshing.

In one optional embodiment, the differential planetary gear set comprises the first left half-shaft planetary gear, the first right half-shaft planetary gear, the second right half-shaft planetary gear, and the second left half-shaft planetary gear. The first upper worm is connected to the first left half-shaft planetary gear through gear meshing. The second upper worm is connected to the second right half-shaft planetary gear through gear meshing. The first lower worm is connected to the first right half-shaft planetary gear through gear meshing. The second lower worm is connected to the second left half-shaft planetary gear through gear meshing.

In one optional embodiment, the first left half-shaft planetary gear is meshed with the left half-shaft output gear. The first right half-shaft planetary gear is meshed with the right half-shaft output gear. The second right half-shaft planetary gear is meshed with the right half-shaft output gear. The second left half-shaft planetary gear is meshed with the left half-shaft output gear.

In one optional embodiment, the first left half-shaft planetary gear is connected to the first right half-shaft planetary gear in gear mesh. The second right half-shaft planetary gear is connected to the second left half-shaft planetary gear in gear mesh. The first left half-shaft planetary gear is connected to the first upper worm in gear mesh. The first right half-shaft planetary gear is connected to the first lower worm in gear mesh. The second right half-shaft planetary gear is connected to the second upper worm. The second left half-shaft planetary gear is connected to the second lower worm in gear mesh.

In one optional embodiment, the worm gear shaft passes through the upper worm gear and the lower worm gear. The brake pads are disposed on the worm gear shaft. The brake pads are respectively located at a top and a bottom of the upper worm gear and a top and a bottom of the lower worm gear. Each of the brake pads is a copper or a friction gasket. The positioning shaft sleeve is disposed on the worm gear shaft. The positioning shaft sleeve is disposed between the upper worm gear and the lower worm gear. The upper worm gear, the lower worm gear, the brake pads, and the positioning shaft sleeve are coaxially disposed.

In one optional embodiment, reference tooth profile parameters of the first lower worm, the second lower worm, the first left half-shaft planetary gear, the second left half-shaft output gear, the first right half-shaft planetary gear, and the second right half-shaft planetary gear are the same.

In one optional embodiment, a parameter of a gear helix angle of the upper worm and worm gear mechanism is opposite to a parameter of a gear helix angle of the lower worm and worm gear mechanism.

Compared with the prior art, the present disclosure provides the differential self-locking device having following beneficial effects:

The differential self-locking device includes the differential housing, the half-shaft output gear set, the upper worm and worm gear mechanism, the lower worm and worm gear mechanism, the differential planetary gear set, and the worm gear shaft. The half-shaft output gear set is disposed in the differential housing. The upper worm and worm gear mechanism, the lower worm and worm gear mechanism, the differential planetary gear set, and the worm gear shaft are disposed in the differential housing. The upper worm and worm gear mechanism and the lower worm and worm gear mechanism respectively convert a large output torque of the left half-shaft output gear and a large output torque of the right half shaft output gear into small input torque thereof, so that the upper worm and worm gear mechanism and the lower worm and worm gear mechanism respectively lock the left half-shaft output gear and the right half-shaft output gear, thereby achieving automatic locking or unlocking of the differential self-locking device. Meanwhile, a traction force of a vehicle is converted into torques of the left half-shaft output gear and the right half-shaft output gear, which improves passing ability of the vehicle. The differential self-locking device significantly reduces a weight and a volume thereof, optimizes a reduction of differential noise, vibration, harshness (NVH), greatly improves a wear of components, conforms to economic benefits, and has a wide application prospect.

Figure 1:
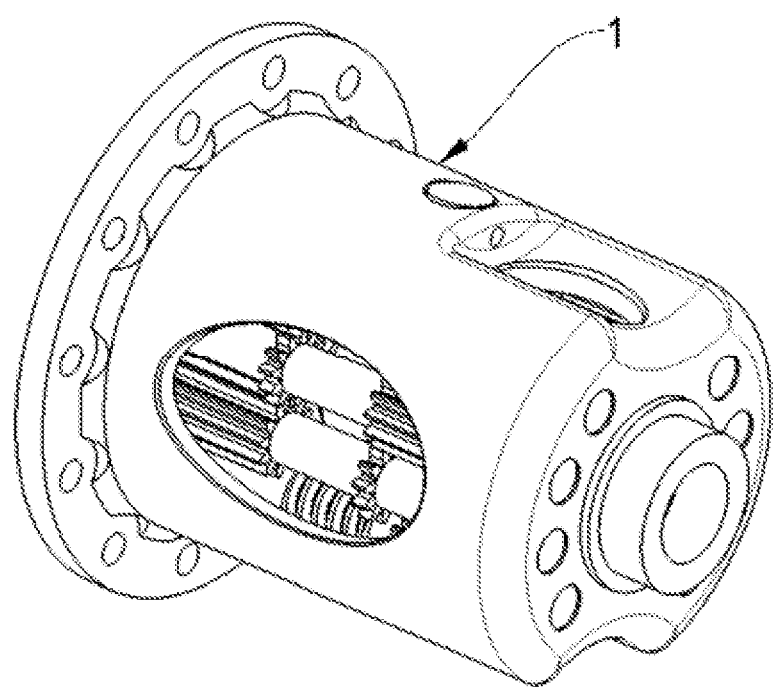
FIG. 1 is a structural schematic diagram of a differential self-locking device of the present disclosure.
Figure 2:
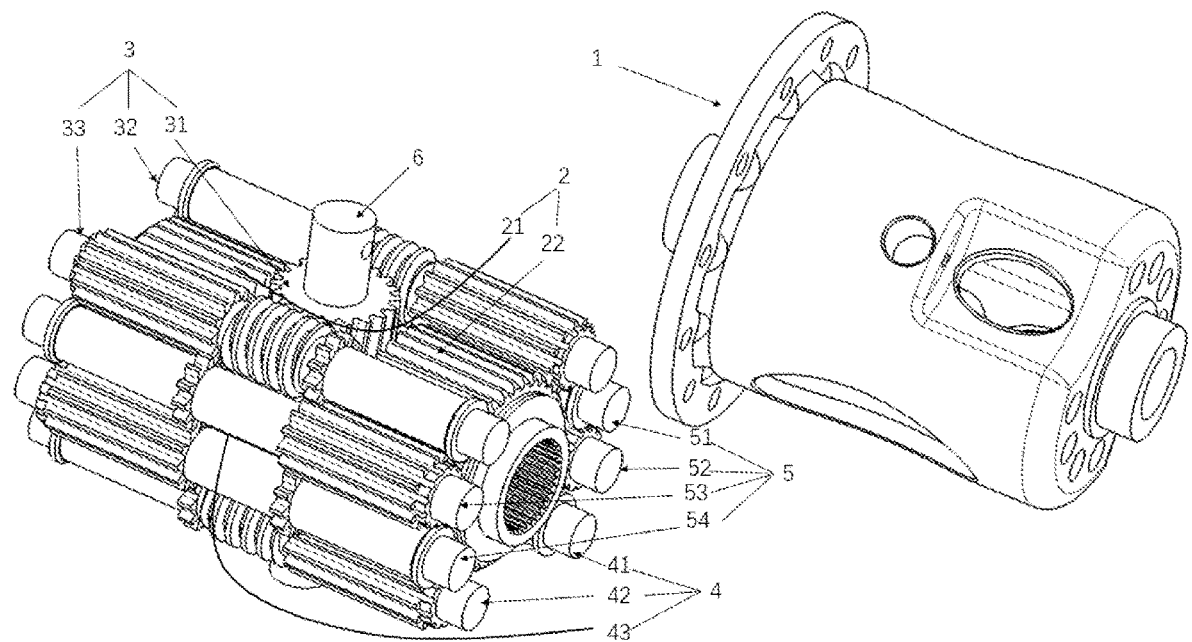
FIG. 2 is an exploded structural schematic diagram of the differential self-locking device of the present disclosure.

Reference numbers in the drawings: 1—differential housing; 2—half-shaft output gear set; 21—left half-shaft output gear; 22—right half-shaft output gear; 3—upper worm and worm gear mechanism; 31—upper worm gear; 32—first upper worm; 33—second upper worm; 4—lower worm and worm gear mechanism; 41—first lower worm; 42—second lower worm; 43—lower worm gear; 5—differential planetary gear set; 51—first left half-shaft planetary gear; 52—first right half-shaft planetary gear; 53—second right half-shaft planetary gear; 54—second left half-shaft planetary gear; 6—worm gear shaft; 7—brake pads; 8—positioning shaft sleeve.

DETAILED DESCRIPTION OF EMBODIMENTS

The technical solutions of the present disclosure are clearly and completely described below with reference to the accompanying drawings and the embodiments. It is clear that the embodiments described below are only some embodiments of the present disclosure, not all embodiments thereof. For the person of ordinary skill in the art, other related embodiments can be obtained according to the embodiments of the present disclosure without any creative effort, which are all within the protection scope of the present disclosure.

As shown in FIGS. 1-4, the present disclosure provides a differential self-locking device including a differential housing 1, a half-shaft output gear set 2, an upper worm and worm gear mechanism 3, a lower worm and worm gear mechanism 4, a differential planetary gear set 5, a worm gear shaft 6, a brake pads 7, and a positioning shaft sleeve 8. The half-shaft output gear set 2, the upper worm and worm gear mechanism 3, the lower worm and worm gear mechanism 4, the differential planetary gear set 5, the worm gear shaft 6, the brake pads 7, and the positioning shaft sleeve 8 are disposed in the differential housing 1. The half-shaft output gear set 2 includes a left half-shaft output gear 21 and a right half-shaft output gear 22. The left half-shaft output gear 21 and the right half-shaft output gear 22 are symmetrically disposed in the differential housing 1. The upper worm and worm gear mechanism 3 and the lower worm and worm gear mechanism 4 are rotationally symmetrically disposed. The upper worm and worm gear mechanism 3 is respectively meshed with the left half-shaft output gear 21 and the right half-shaft output gear 22. The lower worm and worm gear mechanism 4 is respectively meshed with the left half-shaft output gear 21 and the right half-shaft output gear 22. The differential planetary gear set 5 is disposed between the upper worm and worm gear mechanism 3 and the lower worm and worm gear mechanism 4. The differential planetary gear set 5 is meshed with the upper worm and worm gear mechanism 3, the lower worm and worm gear mechanism 4, the left half-shaft output gear 21, and the right half-shaft output gear 22. The worm gear shaft 6 is disposed between the left half-shaft output gear 21 and the right half-shaft output gear 22. The worm gear shaft 6 is coaxially connected to an upper worm gear of the upper worm and worm gear mechanism 3 and a lower worm gear of the lower worm and worm gear mechanism 4.

In one embodiment of the present disclosure, the upper worm and worm gear mechanism 3 includes the upper worm gear 31, a first upper worm 32, and a second upper worm 33. The upper worm gear 31 is disposed between the left half-shaft output gear 21 and the right half-shaft output gear 22. The first upper worm 32 and the second upper worm 33 are rotatably parallelly disposed on two sides of the upper worm gear 31. The first upper worm 32 and the second upper worm 33 are connected to the upper worm gear 31 through gear meshing. One end of the first upper worm 32 is connected to the right half-shaft output gear 22 through gear meshing. One end of the second upper worm 33 is connected to the left half-shaft output gear 21 through gear meshing.

The lower worm and worm gear mechanism 4 includes the lower worm gear 43, a first lower worm 41, and a second lower worm 42. The lower worm gear 43 is disposed between the left half-shaft output gear 21 and the right half-shaft output gear 22. The first lower worm 41 and the second lower worm 42 are rotatably parallelly disposed on two sides of the lower worm gear 43. The first lower worm 41 and the second lower worm 42 are connected to the lower worm gear 43 through gear meshing. One end of the first lower worm 41 is connected to the left half-shaft output gear 21 through gear meshing. One end of the second lower worm 42 is connected to the right half-shaft output gear 22 through gear meshing.

By configuring the friction coefficient and torque between the worm and worm gear, the differential self-locking device is able to be automatically locked or unlocked. In the embodiment, the upper worm gear 31 drives the first upper worm 32 and the second upper worm 33, and the lower worm gear 43 drives the first lower worm 41 and the second lower worm 42. When a torque difference between the left half-shaft output gear 21 and the right half-shaft output gear 22 is large, internal friction of the upper worm and worm gear mechanism 3 and the lower worm and worm gear mechanism 4 limit meshing transmission, so the differential self-locking device is locked, thereby achieving automatic locking of the differential self-locking device. When the torque difference between the left half-shaft output gear 21 and the right half-shaft output gear 22 of the half-shaft output gear set is small, the upper worm gear mechanism 3 and the lower worm gear mechanism 4 are meshed to rotate and are driven normally to achieve automatic unlocking of the differential self-locking device, achieving the differential function of normal driving of the vehicle.

In one embodiment of the present disclosure, the upper worm and worm gear mechanism 3 and the lower worm and worm gear mechanism 4 are meshed in a deceleration relationship with the half-shaft output gear set 2. According to the lever principle, the shorter the lever, the more laborious it is. Thus, a self-locking torque of the upper worm and worm gear mechanism 3 and the lower worm and worm gear mechanism 4 is achieved, and the lever amplification principle is used to lock the output gears of the left half-shaft output gear and the right half-shaft output gear.

In one embodiment of the present disclosure, the differential planetary gear set 5 comprises the first left half-shaft planetary gear 51, the first right half-shaft planetary gear 52, the second right half-shaft planetary gear 53, and the second left half-shaft planetary gear 54. The first upper worm 32 is connected to the first left half-shaft planetary gear 51 through gear meshing. The second upper worm 33 is connected to the second right half-shaft planetary gear 53 through gear meshing. The first lower worm 41 is connected to the first right half-shaft planetary gear 52 through gear meshing. The second lower worm 42 is connected to the second left half-shaft planetary gear 54 through gear meshing.

The first left half-shaft planetary gear 51 is connected to the left half-shaft output gear 24 through gear meshing. The first right half-shaft planetary gear 52 is connected to the right half-shaft output gear 22 through gear meshing. The second right half-shaft planetary gear 53 is connected to the right half-shaft output gear 22 through gear meshing. The second left half-shaft planetary gear 54 is connected to the left half-shaft output gear 21 through gear meshing.

The first left half-shaft planetary gear 51 is connected to the first right half-shaft planetary gear 52 in gear mesh. The second right half-shaft planetary gear 53 is connected to the second left half-shaft planetary gear 54 in gear mesh. The first left half-shaft planetary gear 51 is connected to the first upper worm 32 in gear mesh. The first right half-shaft planetary gear 52 is connected to the first lower worm 41 in gear mesh. The first right half-shaft planetary gear 53 is connected to the second upper worm 33. The second left half-shaft planetary gear 54 is connected to the second lower worm 42 in gear mesh.

Through above arrangement, the first upper worm 32, the second upper worm 33, the first lower worm 41, the second lower worm 42, the first left half-shaft planetary gear 51, first right half-shaft planetary gear 52, the second right half-shaft planetary gear 53, and the second left half-shaft planetary gear 54 jointly load a torque of the differential housing 1, thereby increasing loading capability of the differential self-locking device and making force balanced.

In one embodiment of the present disclosure, the worm gear shaft 6 passes through the upper worm gear 31 and the lower worm gear 43. The brake pads 7 are disposed on the worm gear shaft 6. The brake pads 7 are respectively located at a top and a bottom of the upper worm gear 31 and a top and a bottom of the lower worm gear 43. Each of the brake pads 7 is a copper gasket or a friction gasket. The positioning shaft sleeve 8 is disposed on the worm gear shaft 6. The positioning shaft sleeve 8 is disposed between the upper worm gear 31 and the lower worm gear 43. The upper worm gear 31, the lower worm gear 43, the brake pads 7, and the positioning shaft sleeve 8 are coaxially disposed. Axial forces are generated when the upper worm gear 31 and the lower worm gear 43 rotate. When a worm gear locking friction force needs to be increased, each of the brake pads 7 is the friction gasket. When the worm gear locking friction force does not need to be increased, each of the brake pads 7 is the copper gasket.

In one embodiment of the present disclosure, reference tooth profile parameters of the first lower worm 41, the second lower worm 42, the first left half-shaft planetary gear 51, the second left half-shaft output gear 54, the first right half-shaft planetary gear 52, and the second right half-shaft planetary gear 53 are the same. A parameter of a gear helix angle of the upper worm and worm gear mechanism is opposite to a parameter of a gear helix angle of the lower worm and worm gear mechanism. Gear parameters of the left half-shaft output gear 21 and the right half-shaft output gear are the same.

Figure 3:
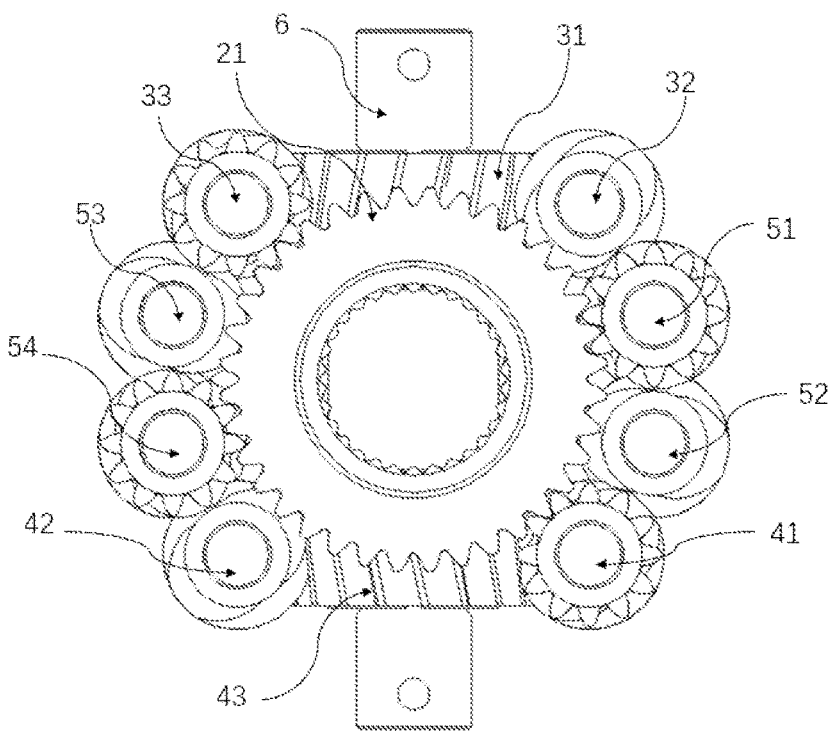
FIG. 3 is a side elevational structural schematic diagram of a half-shaft output gear set of the differential self-locking device of the present disclosure.
Figure 4:
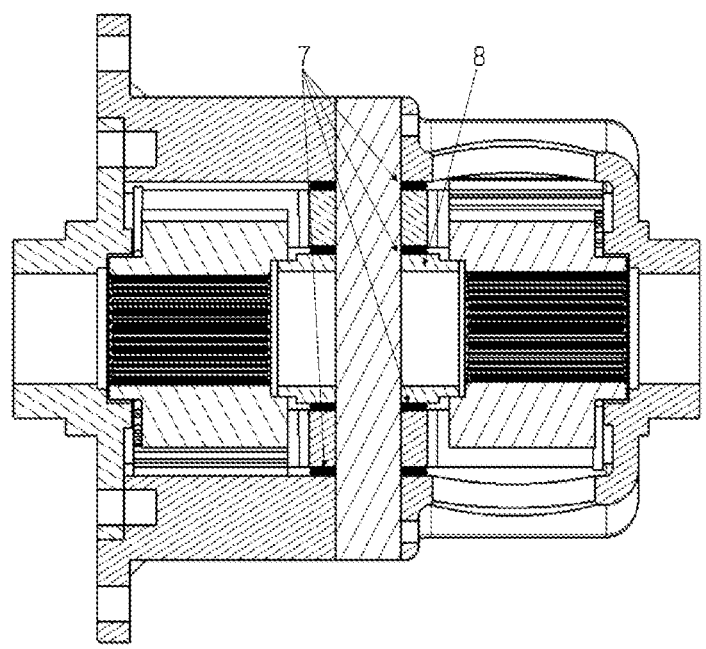
FIG. 4 is a cross-sectional structural schematic diagram of the differential self-locking device of the present disclosure.

As shown in FIG. 3, since the parameter of the gear helix angle of the upper worm and worm gear mechanism 3 is opposite to the parameter of the gear helix angle of the lower worm and worm gear mechanism 4, an axial force generated by movement of the upper worm and worm gear mechanism 3 is opposite to an axial force generated by the movement of the lower worm and worm gear mechanism 4. Parameters of other features of the upper worm and worm gear mechanism 3 and the lower worm and worm gear mechanism 4 are same.

The differential self-locking device is capable of automatically locking or unlocking the worm gear through the friction coefficient between the worm gear and the worm gear, as well as distributing the output torque of the left half-shaft output gear 21 and the right half-shaft output gear 22. The friction between the worms and worm gears depends on the torque difference between the left half-shaft output gear 21 and the right half-shaft output gear 22. The torque input from the differential housing 1 is distributed to the left half-shaft output gear 21 or the right half-shaft output gear 22 by internal friction changes in the upper worm and worm gear mechanism 3 and the lower worm and worm gear mechanism 4. The differential self-locking device is a fully automatic and purely mechanical differential self-locking device, which is reliable and durable, and responses quickly. That is, the differential self-locking device is a balanced design, responses quickly to the torque difference between the left half-shaft output gear 21 and the right half-shaft output gear 22, and adjusts the output torque of the left half-shaft output gear 21 and the output torque of the right half-shaft output gear 22 to solve a problem of skidding of vehicle wheels. The differential self-locking device is linear self-locking, and is able to adjust the output torque of the left half-shaft output gear 21 and the output torque of the right half-shaft output gear 22 within a wide range of torque thereof, without being affected by a space of the differential housing 1 and limiting the self-locking function of the differential self-locking device.

The upper worm and worm gear mechanism, the lower worm and worm gear mechanism, the differential planetary gear set, and the worm gear shaft are disposed in the differential housing. The upper worm and worm gear mechanism and the lower worm and worm gear mechanism respectively convert a large output torque of the left half-shaft output gear and a large output torque of the right half-shaft output gear into small input torque thereof based on the friction force, so that the left half-shaft output gear and the right half-shaft output gear are respectively locked, thereby achieving automatic locking or unlocking of the differential self-locking device. Meanwhile, a traction force of the vehicle is converted into torques of the left half-shaft output gear and the right half-shaft output gear, which improves passing ability of the vehicle. The differential self-locking device significantly reduces a weight and a volume thereof, optimizes a reduction of differential noise, vibration, harshness (NVH), greatly reduce wear of components, conforms to economic benefits, and has a wide application prospect.

It should be noted that, such as the terms "include", "comprise", or any other variant thereof described herein are intended to cover a non-exclusive inclusion, such that a process, method, article, or apparatus, including a series of elements, not only includes those elements, but also includes other elements not explicitly listed, or elements inherent to the process, method, article, or apparatus. In absence of more restrictions, a statement "includes a" defined element does not exclude presence of another same element in the process, method, article, or apparatus that includes the element.

What is claimed is:

1. A differential self-locking device, comprising:
a differential housing;
a half-shaft output gear set;
an upper worm and worm gear mechanism;
a lower worm and worm gear mechanism;
a differential planetary gear set;
a worm gear shaft;
brake pads; and
a positioning shaft sleeve;
wherein the half-shaft output gear set, the upper worm and worm gear mechanism, the lower worm and worm gear mechanism, the differential planetary gear set, the worm gear shaft; the brake pads; and the positioning shaft sleeve are disposed in the differential housing; the half-shaft output gear set comprises a left half-shaft output gear and a right half-shaft output gear; the left half-shaft output gear and the right half-shaft output gear are symmetrically disposed in the differential housing;
wherein the upper worm and worm gear mechanism and the lower worm and worm gear mechanism are rotationally symmetrically disposed; the upper worm and worm gear mechanism and the lower worm and worm gear mechanism are connected to the left half-shaft output gear and the right half-shaft output gear;
wherein the differential planetary gear set is disposed between the upper worm and worm gear mechanism and the lower worm and worm gear mechanism; the differential planetary gear set is connected to the upper worm and worm gear mechanism, the lower worm and worm gear mechanism, the left half-shaft output gear, and the right half-shaft output gear through gear meshing; the worm gear shaft is disposed between the left half-shaft output gear and the right half-shaft output gear.

2. The differential self-locking device according to claim 1, wherein the upper worm and worm gear mechanism comprises an upper worm gear, a first upper worm, and a second upper worm; the upper worm gear is disposed between the left half-shaft output gear and the right half-shaft output gear; the first upper worm and the second upper worm are rotatably parallelly disposed on two sides of the upper worm gear; the first upper worm and the second upper worm are connected to the upper worm gear.

3. The differential self-locking device according to claim 2, wherein one end of the first upper worm is connected to the right half-shaft output gear through gear meshing; one end of the second upper worm is connected to the left half-shaft output gear through gear meshing.

4. The differential self-locking device according to claim 2, wherein the lower worm and worm gear mechanism comprises a lower worm gear, a first lower worm, and a second lower worm; the lower worm gear is disposed between the left half-shaft output gear and the right half-shaft output gear; the first lower worm and the second lower worm are rotatably parallelly disposed on two sides of the lower worm gear; the first lower worm and the second lower worm are connected to the lower worm gear through gear meshing.

5. The differential self-locking device according to claim 4, wherein one end of the first lower worm is connected to the left half-shaft output gear through gear meshing; one end of the second lower worm is connected to the right half-shaft output gear through gear meshing.

6. The differential self-locking device according to claim 4, wherein the differential planetary gear set comprises a first left half-shaft planetary gear, a first right half-shaft planetary gear, a second right half-shaft planetary gear, and a second left half-shaft planetary gear; the first upper worm is connected to the first left half-shaft planetary gear through gear meshing; the second upper worm is connected to the second right half-shaft planetary gear through gear meshing; the first lower worm is connected to the first right half-shaft planetary gear through gear meshing; the second lower worm is connected to the second left half-shaft planetary gear through gear meshing.

7. The differential self-locking device according to claim 6, wherein the first left half-shaft planetary gear is connected to the left half-shaft output gear through gear meshing; the first right half-shaft planetary gear is connected to the right half-shaft output gear through gear meshing; the second right half-shaft planetary gear is connected to the right half-shaft output gear through gear meshing; the second left half-shaft planetary gear is connected to the left half-shaft output gear through gear meshing.

8. The differential self-locking device according to claim 6, wherein the first left half-shaft planetary gear is connected to the first right half-shaft planetary gear in gear mesh; the second right half-shaft planetary gear is connected to the second left half-shaft planetary gear in gear mesh; the first left half-shaft planetary gear is connected to the first upper worm in gear mesh; the first right half-shaft planetary gear is connected to the first lower worm in gear mesh; the second right half-shaft planetary gear is connected to the second upper worm; the second left half-shaft planetary gear is connected to the second lower worm in gear mesh.

9. The differential self-locking device according to claim 6, wherein the worm gear shaft passes through the upper worm gear and the lower worm gear; the brake pads are disposed on the worm gear shaft; the brake pads are respectively located at a top and a bottom of the upper worm gear and a top and a bottom of the lower worm gear;

wherein each of the brake pads is a copper gasket or a friction gasket;

wherein the positioning shaft sleeve is disposed on the worm gear shaft; the positioning shaft sleeve is disposed between the upper worm gear and the lower worm gear; the upper worm gear, the lower worm gear, the brake pads, and the positioning shaft sleeve are coaxially disposed.

* * * * *